March 18, 1930.    M. L. GRAY ET AL    1,751,200
AUTOMOBILE SCREEN
Filed Sept. 17, 1928    2 Sheets-Sheet 2
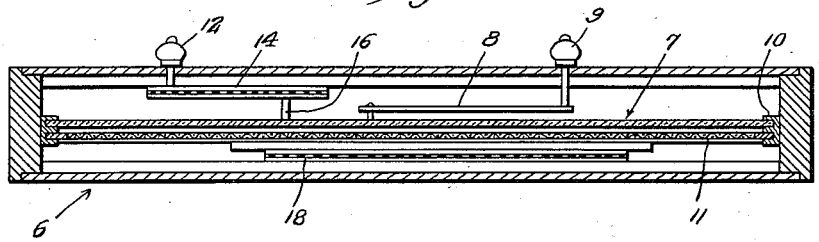
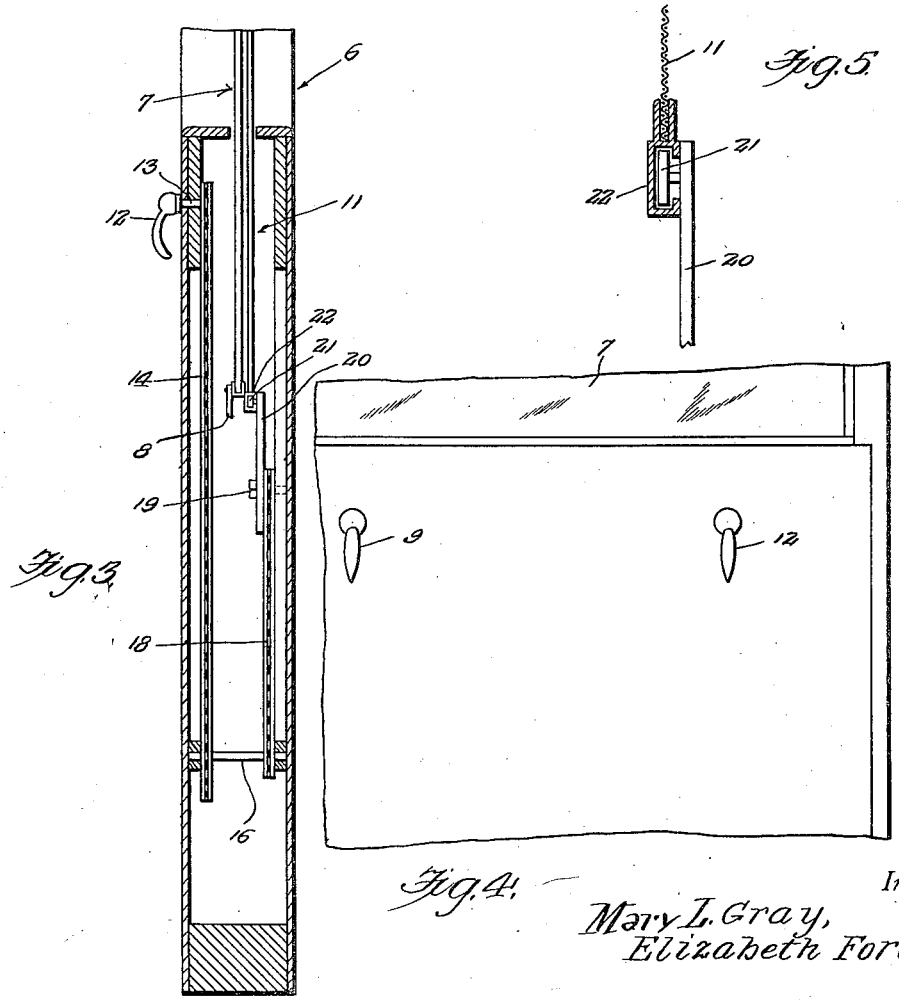
Inventor
Mary L. Gray,
Elizabeth Ford,
By Clarence A. O'Brien
Attorney Patented Mar. 18, 1930

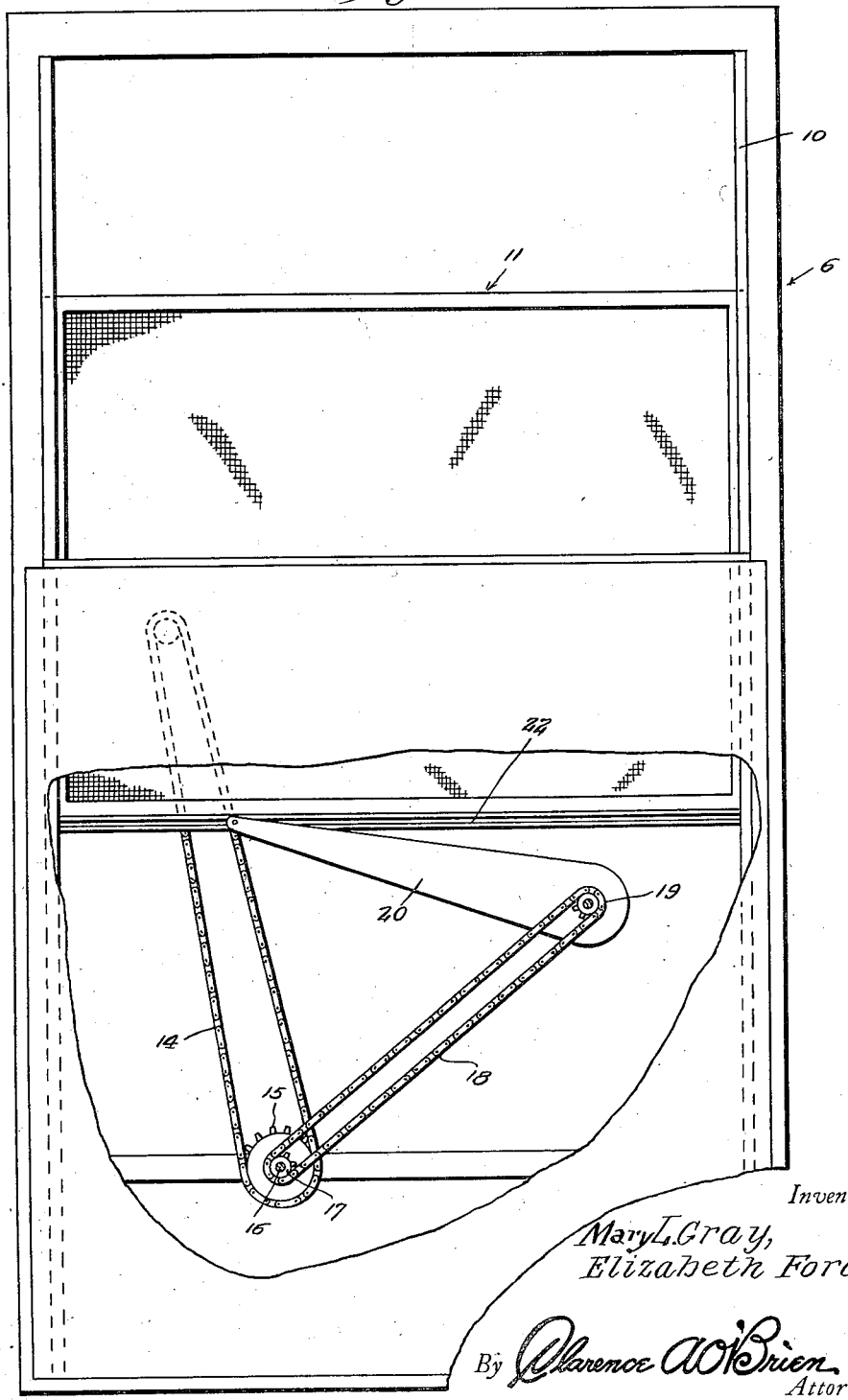

1,751,200

UNITED STATES PATENT OFFICE

MARY L. GRAY AND ELIZABETH FORD, OF WAVERLY, VIRGINIA

AUTOMOBILE SCREEN

Application filed September 17, 1928. Serial No. 306,435.

This invention relates to an improved screen structure, especially, but not necessarily adapted to be embodied in the construction of automobile doors of the type having sliding glass windows.

In accordance with the present invention the door will be provided with the customary sliding glass window and individual operating knob or handle therefor. In addition it will be provided alongside of the window with a sliding screen so that when the window is down, the screen may be moved up to cover the opening to keep out insects, particles of dirt and other extraneous matter such as otherwise enters the car while driving.

As intimated, the principal purpose of the invention is to screen the window opening whenever desired to prevent entrance of bees, flies, insects and the like while driving and to keep flies and other insects from accumulating in the car while parked. The invention serves to protect children while traveling and allows them to sleep without interference from flies entering while in motion. The invention serves to protect the sick while traveling in an ambulance from place to place and allows the patients to keep cool and at the same time guards them against infection. These and other advantages and features of the invention will become apparent from the following description and drawings.

In the drawings:

Figure 1 is a view of an automobile door and a portion of a side wall of a closed car showing the improved screen structure embodied therein.

Figure 2 is a horizontal section through the structure.

Figure 3 is a vertical section.

Figure 4 is a fragmentary elevational view showing the location of the screen and window operating handle.

Figure 5 is a detail view showing the operating connection between the screen and a roller equipped crank arm.

In the drawings reference character 6 designates generally an automobile door or a portion of a side wall of a body of a closed car type. The sliding glass window is designated by the reference character 7 and is operated by the customary link connection 8 controlled from the handcrank 9. The window is slidable in customary guide channels in a structure as is indicated at 10. Disposed alongside of the window is the auxiliary screen 11 also slidable in the channel device 10. The principal improvement in the screen construction is the means for raising and lowering it. Referring to Figure 3 it will be seen that this means comprises a hand grip 12 on a short shaft 13 carrying a sprocket over which a relatively long sprocket chain 14 is trained. The opposite end of the chain passes around the largest sprocket 15 on a shaft 16 as shown better in Figure 1. Also on this shaft 16 is a smaller sprocket 17 over which a shorter sprocket chain 18 passes. The chain 18 is disposed at a diverging angle with respect to the chain 14 as indicated in Fig. 1 and at its upper end is trained over a small sprocket on a crank shaft 19. This shaft carries the long crank arm 20 and at its free end this crank arm is provided with an antifriction roller 21 operable in a guide channel 22 formed on the bottom of the screen. Obviously then, through the medium of this handle 12 and the sprocket chain connection and crank arm construction, this screen can be raised and lowered independently of the window.

Considering the description in conjunction with the drawings it will be seen that we have evolved and produced a novel combination window and screen structure which, it is believed, has been previously unequalled in the art. It is thought that this invention will fulfill the requirements of a device of this class in a positive and dependable manner. It is smooth and quiet in operation and is a mechanical achievement as compared to known prior art devices. It is economical, easy to install, and efficient in performance. It is further characterized by features of simplicity and inexpensiveness and is therefore regarded as an important improvement in the art. It is thought however, the person skilled in the art to which the invention relates will be able to obtain a clear understanding of the same after considering a description in connection with the drawings. Therefore, a more lengthy description is regarded as unnecessary.

Minor changes in shape, size and rearrangement of details coming within the field of invention claimed may be resorted to in actual practice if desired.

We claim:

In an operating mechanism for the screen frame of an automobile door, said frame having at the bottom thereof a horizontal guide channel, a crank shaft rotatably mounted in the door, a crank arm carried by said shaft and having on its free end a roller arranged to said guide channel, a sprocket wheel on said shaft, a second shaft, a pair of sprocket wheels on said second shaft, an endless flexible chain trained over the first mentioned sprocket wheel and one of the sprocket wheels of said pair for operatively connecting said shaft, a sprocket wheel having means for manual rotation thereof and a second endless flexible chain trained over the last mentioned sprocket wheel and the other sprocket wheel of said pair, substantially as described.

In testimony whereof we affix our signatures.

Mrs. MARY L. GRAY.
ELIZABETH FORD.